United States Patent [19]

Johnson

[11] Patent Number: 4,540,756

[45] Date of Patent: Sep. 10, 1985

[54] PROCESS FOR MAKING LOW CRYSTALLINITY POLYOLEFINS

[75] Inventor: John H. Johnson, Wilmington, Del.

[73] Assignee: Hercules Incorporated, Wilmington, Del.

[21] Appl. No.: 612,489

[22] Filed: May 21, 1984

Related U.S. Application Data

[63] Continuation-in-part of Ser. No. 547,695, Nov. 1, 1983, abandoned.

[51] Int. Cl.³ .......................... C08F 4/44; C01F 11/00
[52] U.S. Cl. .................................... 526/124; 526/348; 526/348.6; 526/351; 502/115; 423/593
[58] Field of Search .................. 526/124, 348, 348.6, 526/351

[56] References Cited

U.S. PATENT DOCUMENTS

| | | | |
|---|---|---|---|
| 2,956,993 | 10/1960 | Nowlin et al. | 260/94.9 |
| 3,644,318 | 2/1972 | Diedrich et al. | 260/88.2 |
| 3,933,934 | 1/1976 | Bailly et al. | 260/683.15 D |
| 3,951,935 | 4/1976 | Engelmann | 526/129 |
| 4,133,824 | 1/1979 | Malpass et al. | 260/488 |
| 4,168,361 | 9/1979 | Oda et al. | 526/348.6 |
| 4,319,010 | 3/1982 | van den Berg | 526/124 |
| 4,439,537 | 3/1984 | Murai et al. | 502/105 |

FOREIGN PATENT DOCUMENTS

| | | | |
|---|---|---|---|
| 921014 | 2/1973 | Canada | 526/124 |
| 2039501 | 8/1980 | United Kingdom | 526/124 |

OTHER PUBLICATIONS

Abstract of Belgian Pat. No. 750,317.

*Primary Examiner*—Joseph L. Schofer
*Assistant Examiner*—Fred M. Teskin
*Attorney, Agent, or Firm*—Hazel L. Deming

[57] ABSTRACT

Disclosed is a solution polymerization process for obtaining high yields of high molecular weight, low crystallinity polymers of propylene and higher 1-olefins at low catalyst levels. The polymerization is carried out using a catalyst system containing a soluble transition metal component derived from magnesium carboxylate and a salt of titanium, zirconium or hafnium, and specified alkyl aluminum halide activators.

17 Claims, No Drawings

4,540,756

PROCESS FOR MAKING LOW CRYSTALLINITY POLYOLEFINS

This application is a continuation-in-part of application Ser. No. 547,695 filed Nov. 1, 1983, now abandoned.

BACKGROUND OF THE INVENTION

This invention relates to the polymerization of olefins and particularly relates to the preparation of high molecular weight, low crystallinity polyolefins using a Ziegler-Natta catalyst system.

As is well known in the art, effective catalyst systems for polymerization of 1-olefins are Ziegler-Natta catalyst systems, such as those obtained by combining a transition metal compound of group IVB of the Periodic Table with an activator which is an organometallic compound of Group IIIA of the Table. Catalyst systems containing $TiCl_4$ or $TiCl_3$ and aluminum alkyl or aluminum alkyl chloride activators are known to provide mixtures of crystalline and low crystallinity polypropylene. However, low crystallinity polyolefins having levels of crystallinity on the order of only 10 to 20% are difficult to obtain using these catalysts, and high levels of catalysts are required to obtain satisfactory yields of polymer, thus necessitating special techniques in recovering the product to remove residual catalyst.

The use of $TiCl_3$ and $TiCl_4$-treated magnesium chloride supported catalyst components or hydrocarbon-insoluble reaction products of a tetravalent halogenated titanium compound and a magnesium alcoholate with organoaluminum compounds to polymerize 1-olefins is also disclosed in the art. Supported catalyst components of these types generally provide polyolefins having high crystallinity, on the order of 65% or more.

Further, it is known from U.S. Pat. No. 3,933,934 to Bailly et al. that atactic waxes can be produced with a Ziegler-Natta catalyst system wherein the transition metal component is formed by the reaction of metallic magnesium, an alkyl halide and a titanium compound and the activator is an organoaluminum compound. The magnesium-based titanium compound used by Bailly et al. as the transition metal component of the catalyst is a hydrocarbon insoluble material which must be separately prepared and isolated before use in the polymerization. Additionally, due to the insoluble nature of the catalyst component, some residue accumulates in the resulting polymer, thus necessitating costly and labor intensive clean-up procedures to obtain polymers of good clarity, color and stability.

Recently catalyst systems which are soluble in the reaction medium have been described in the art. For example, van den Berg in U.S. Pat. No. 4,319,010 teaches using a catalyst obtained by mixing a titanium compound, a soluble magnesium salt or complex and an organoaluminum halide in the reaction solvent to obtain high yields of high molecular weight crystalline homopolymers of ethylene at low catalyst levels. See also British publication No. 2,039,501 A which teaches using a catalyst system containing a magnesium halide which has been solubilized with an electron donor, a transition metal compound and an organoaluminum compound in the continuous polymerization of ethylene or mixtures of ethylene with small amounts of other alpha-olefins in hydrocarbon solvents.

SUMMARY OF THE INVENTION

Now in accordance with this invention it has been found that when 1-olefins containing at least 3 carbon atoms are solution polymerized in the presence of a specific catalyst system of the Ziegler-Natta type high yields of low crystallinity polyolefins having high molecular weight at low catalyst levels are obtained. Accordingly, the present invention relates to a process for the production of high molecular weight polyolefins having a degree of crystallinity less than about 25%, which process comprises polymerizing at least one 1-olefin containing at least 3 carbon atoms or a mixture of at least one of said olefins with up to about 67 weight % of ethylene in an inert liquid hydrocarbon diluent at a temperature ranging from about 25° C. to about 90° C. in the presence of a catalytic amount of a catalyst system consisting essentially of (a) a hydrocarbon soluble transition metal component derived by contacting in an inert liquid hydrocarbon (1) a soluble, halide free magnesium carboxylate with (2) a soluble salt of a transition metal selected from the group consisting of tetravalent titanium, zirconium and hafnium, and (b) an alkylaluminum halide activator having the general formula $R_nAlX_{3-n}$ where R is a 1 to 18 carbon alkyl group and n is a number from 1.5 to 2.5, the molar ratio of transition metal salt to magnesium carboxylate being 0.003 to 3, the molar ratio of alkylaluminum halide activator to transition metal salt being at least 1 and the molar ratio of alkylaluminum halide activator to magnesium carboxylate being greater than 2.5.

DETAILED DESCRIPTION OF THE INVENTION

The transition metal component of the catalyst system used in the invention is a hydrocarbon soluble reaction product or complex formed by contacting (1) a hydrocarbon soluble magnesium carboxylate with (2) a hydrocarbon soluble salt of a transition metal of group IVB of the Periodic Table.

The magnesium carboxylates which provide hydrocarbon soluble reaction products or complexes are halide free and are soluble in hydrocarbon diluents which are used as solvents in solution polymerization reactions. Representative magnesium compounds have the general formula $Mg(OOCR')_2$ where each R' is alike or different and is derived from a carboxylic acid containing at least 2 carbon atoms and preferably is an alkyl group containing from 5 to 17 carbon atoms. The preferred magnesium carboxylates are those derived from 2-methyl-, 3-methyl-, 2,2-dimethyl- and 2,2,4,4,-tetramethyl-pentanoic acids; 2-ethyl-, 2-methyl- and 3,5,5-trimethyl-hexanoic acids; 2-ethyl-2-methylbutyric acid; 2,3-dimethyl-2-isopropylbutyric acid; 2,2-dimethylheptanoic acid; 2,2-dimethyloctanoic acid; 2,2-dimethylnonanoic acid; decanoic acid; 2,2-dimethyl decanoic acid; undecanoic acid; 2,2-dimethylundecanoic acid; dodecanoic acid; 2,2-dimethyldodecanoic acid; tridecanoic acid; 2,2-dimethyltridecanoic acid; 2,2-dimethylpentadecanoic acid; oleic acid; phenylacetic acid; 4-cyclohexylphenylacetic acid; alpha-cyclopentylphenylacetic acid; 3-cyclohexyl-3-cyclo- pentyl- and 3-phenylpropionic acids; 2-, 3- and 4-cyclohexyl- and phenyl-butyric acids; and 5-cyclohexyl- and phenyl-pentanoic acids. Mixtures of these acids can be used in the formation of the hydrocarbon-soluble magnesium carboxylates, as for example the naphthenic acids recovered as by-products of the refining of petroleum distillates. The most preferred acids are the monocarboxylic acids containing an alpha-quaternary carbon atom available commercially as the "Neo" acids of Exxon Chemical Co. and the "Versatic" acids of Shell Chemical Co., and particularly neodecanoic acid.

The magnesium carboxylates are readily prepared by heating essentially stoichiometric amounts of magnesium oxide or hydroxide and the desired carboxylic acid, preferably in a high boiling hydrocarbon diluent such as kerosene in order to azeotrope the water of reaction. The magnesium carboxylate can be recovered from the diluent, if desired, but preferably is diluted to the desired concentration and used as such.

The transition metal component of the catalyst system described in this invention is derived by contacting in a hydrocarbon diluent the magnesium carboxylate and a hydrocarbon soluble salt of a transition metal of group IVB of the Periodic Table. Tetravalent transition metal compounds having the general formula $Me(X_{4-n})(OR'')_n$ or $Me(X_{4-m})(OOCR'')_m$ where Me represents a titanium, zirconium or hafnium atom; X represents a halogen atom, preferably chlorine; R'' represents an alkyl, preferably containing from 1 to about 10 carbon atoms; and n and m represent whole numbers or fractions of any value from 0 to 4 are preferred. The above transition metal compounds are well known Ziegler-Natta catalyst components. Examples of particularly preferred transition metal compounds include titanium tetrachloride, butoxy titanium trichloride, titanium tetrabromide and titanium tetraiodide. The most preferred transition metal compound is titanium tetrachloride.

The magnesium carboxylate and the transition metal compound are contacted in an inert liquid hydrocarbon diluent at a relative concentration which will provide a molar ratio of transition metal salt to magnesium carboxylate in the range of 0.003:1 to 3:1, preferably in the range of 0.01:1 to 2:1. The contacting can take place at any convenient temperature such as 20° C. to 80° C., and is preferably conducted at 50° C. to 60° C. Because no workup is required, the contacting can also occur in situ, i.e. by adding the magnesium salt and then the transition metal compound, as such or in solution, to a polymerization vessel charged with diluent containing the alkyl aluminum halide activator. In the preferred procedure, separate solutions of the magnesium carboxylate and the transition metal compound at suitable concentrations are prepared, and the solutions or portions of the solutions are combined to give a premix containing the transition metal component of the catalyst system in solution in a desired solvent.

The hydrocarbons used as solvents in the polymerization can be any liquid hydrocarbon or mixtures thereof. Representative hydrocarbon solvents are the three carbon to twelve carbon aliphatic hydrocarbons, the five to twelve carbon cycloaliphatic hydrocarbons, the six to twelve carbon monocyclic aromatic hydrocarbons or their halogenated derivatives and mixtures of any of these hydrocarbons. The preferred hydrocarbon solvents are isobutane and hexane. Alternatively, in some embodiments, the 1-olefin which is to be polymerized can be employed as the hydrocarbon solvent.

The alkyl aluminum halide activator which makes up the other compound of the catalyst system has the general formula $R_nAlX_{3-n}$, where R represents an alkyl containing 1 to 18 carbon atoms; X represents a halogen, preferably chlorine; and n represents a whole or a fraction of any value in the range of 1.5 to 2.5 and preferably in the range of 1.7 to 2.2. R can be, for example, ethyl, n-propyl, isopropyl, n-butyl, isobutyl, sec-butyl, tert-butyl, n-amyl, isoamyl, n-hexyl, n-heptyl or n-octyl. The activator is used in quantities such that the molar ratio of the aluminum metal in the activator to the transition metal is at least 1, preferably between 1 and about 5000, and more preferably between about 10 and about 500. The molar ratio of aluminum to magnesium is greater than 2.5:1, preferably between about 3:1 and about 20:1, and more preferably between about 3.5:1 and about 10:1.

The amount of catalyst employed in this invention is an amount sufficient to catalyze the polymerization of 1-olefins containing at least 3 carbon atoms into low crystallinity homopolymers and copolymers. In general the amount of catalyst used will provide a concentration of transition metal during the polymerization reaction between about 0.02 and about 0.4 millimole per liter of hydrocarbon solvent.

Low crystallinity homopolymers are preferably prepared from the three carbon to twelve carbon 1-olefins and more preferably from the three to eight carbon 1-olefins, with propylene and 1-butene being most preferred. Copolymers are prepared by polymerizing 2 or more monomers selected from the group of ethylene and three to twelve carbon 1-olefins. In those copolymers which contain ethylene, ethylene should be present in an amount less than about 67 weight percent and preferably less than about 60 weight percent. The other monomers can be incorporated into copolymers in any ratio. Representative of the low crystallinity copolymers advantageously produced are copolymers of ethylene and propylene, ethylene and 1-butene and propylene and 1-butene.

The polymerization is carried out in a conventional manner in the hydrocarbon solvent. The solution polymerization temperature is between about 25° and about 90° C., preferably between 30° and 75° C. The polymerization is typically carried out at a pressure generally below 30 bars.

When the polymerization is carried out in the presence of more than one monomer, the monomers may be introduced into the reactor either as a constant composition mixture or the composition of the mixture may be varied during the course of polymerization.

The polymerization is quenched by conventional means such as by steam treatment or by venting and pouring out the reaction mixture. The polymeric product consists of solvent-soluble polymer in solution in the diluent and in some instances a small amount of solvent-insoluble polymer. The solvent-soluble fraction is conveniently recovered from the diluent by conventional means such as by evaporation.

The polyolefins produced in accordance with this invention generally contain less than 20 parts per million (ppm) by weight transition metal and, therefore, for most applications, do not require any further purification. The polyolefins are high molecular weight, low crystallinity polymers and contain less than about 25% crystallinity as determined by X-ray diffraction or thermal analysis on the total product. The portion of the polymer which is soluble (measured in hexane at 60° C.) makes up at least 75% by weight of the total product. The intrinsic viscosity (measured in decahydronaphthalene at 135° C.) of the soluble fraction of the polymer is typically in the range of from about 0.5 to about 1.8. It is possible to reduce the molecular weight of the polymer by employing conventional methods such as by adding hydrogen to the monomer prior to the monomer's introduction into the reaction vessel.

The polyolefins produced in accordance with this invention have a wide variety of uses, particularly in industrial applications. Representative applications include use in adhesives, as viscosity index improvers, as impact modifiers, as wax modifiers, as non-volatile plasticizers and as replacements for plasticized polyvinyl chloride.

The best mode now contemplated of carrying out this invention is exemplified by the following working examples of preferred specific embodiments. This invention is not limited to these specific examples.

The magnesium neodecanoate used in the examples is prepared by adding to an agitated mixture containing 64.18 grams (1.10 moles) of magnesium hydroxide and 800 ml of kerosene (Isopar H), 344.6 grams (2.0 moles) of neodecanoic acid over a 1.5 hour period while heating to 115° C. The mixture is gradually heated to reflux and maintained under reflux conditions until no more water is collected, after which time the mixture is cooled to 100° C., diluted with additional Isopar H and filtered, if necessary, to remove any insoluble material. The mixture is next diluted to about 0.3 molar magnesium neodeconate with hexane, analyzed and stored. This magnesium neodecanoate solution is used to prepare the premixes described in the examples by mixing, in the desired ratios, the magnesium neodecanoate solution with a 0.1 molar solution of titanium tetrachloride in hexane and diluting, if necessary, to a desired concentration.

EXAMPLES 1-3

Examples 1-3 illustrate preferred embodiments of the preparation of low crystallinity polypropylene with a catalyst system which is the hydrocarbon soluble reaction product of magnesium neodecanoate and TiCl$_4$ and varying proportions of an activator which is diethylaluminum chloride (Et$_2$AlCl).

In each example, 400 ml of hexane is placed in a 28 oz. pop bottle containing a magnetic stirring bar and then sparged at 60° C. with an inert gas. Sufficient Et$_2$AlCl as a 0.4 molar solution in hexane is added to the sparged diluent to produce the aluminum to magnesium ratio shown in Table 1. Next, 10 ml of a premix 2.0 mmolar with respect to TiCl$_4$ and 10.0 mmolar with respect to magnesium neodecanoate is added.

The inert gas is sparged from the pop bottle using propylene and the pressure of the propylene is adjusted to 40 psig. The polymerization is continued at 60° C. for 3 hours. The reaction product is filtered, the hexane evaporated from each fraction and the diluent-soluble polypropylene is recovered. Table 1 provides further details for each example and polymerization data. In Table 1 and subsequent Tables, "yield, g" refers to the total amount, in grams, of polymeric product recovered; "soluble" refers to the fraction of the total product which is soluble in the diluent at 60° C.; "Mileage" refers to the grams of polymer produced per millimole of titanium; "I.V." is the intrinsic viscosity measured at 135° C. in decahydronaphthalene; and "Cryst %" is the percent of the polymeric product which is crystalline, as determined by x-ray diffraction, unless otherwise specified.

TABLE 1

| Example No. | Catalyst Components, Millimoles | | | | Polymerization Data | | | | Insoluble |
|---|---|---|---|---|---|---|---|---|---|
| | Al | Mg | Ti | Al:Mg | Yield, g | Mileage | Soluble Polymer | | IV |
| | | | | | | | % | Cryst % | IV | |
| 1 | 0.4 | 0.1 | 0.02 | 4:1 | 69.0 | 3450 | 86.5 | 10 | 0.87 | 3.08 |
| 2 | 0.6 | 0.1 | 0.02 | 6:1 | 65.8 | 3290 | 84.7 | 10 | 0.98 | 2.98 |
| 3 | 0.8 | 0.1 | 0.02 | 8:1 | 41.9 | 2095 | 85.0 | 10 | 0.95 | 2.83 |

EXAMPLES 4-8

Examples 4-8 exhibit preferred embodiments of the preparation of low crystallinity polypropylene using a catalyst system which is a premix formed by contacting varied proportions of a hexane solution of magnesium neodecanoate (Mg(ND)$_2$) and a hexane solution of titanium tetrachloride, and an activator which is diethylaluminum chloride (Et$_2$AlCl) dissolved in hexane.

400 ml of hexane is placed in a 28 oz. pop bottle containing a magnetic stirrer and sparged at 60° C. with an inert gas. The amount of Et$_2$AlCl shown in Table 2 is added to the hexane. Next is added the magnesium neodecanoate and titanium tetrachloride in the amounts shown in Table 2. The inert gas is sparged from the vessel using propylene. The pressure of the propylene is raised to 40 psig. The reactions are carried out until stirring is no longer possible. The times at 60° C. are shown in Table 2, at which time the resulting low crystallinity (less than 15%) propylene polymers are recovered as in Examples 1-3.

TABLE 2

| Example No. | Et$_2$AlCl (mmole) | TiCl$_4$ (mmole) | Mg(ND)$_2$ (mmole) | Time (hr) | Polymerization Data | | | | Insoluble IV |
|---|---|---|---|---|---|---|---|---|---|
| | | | | | Yield, g | Mileage | Soluble | | |
| | | | | | | | % | IV | |
| 4 | 0.25 | 0.005 | 0.05 | 5.0 | 36.7 | 7340 | 86.5 | 0.84 | 2.67 |
| 5 | 0.25 | 0.01 | 0.05 | 5.0 | 53.7 | 5370 | 88.2 | 0.77 | 2.55 |
| 6 | 0.50 | 0.03 | 0.10 | 4.6 | 85.6 | 2853 | 85.4 | 0.79 | 2.95 |
| 7 | 1.50 | 0.01 | 0.30 | 5.5 | 75.0 | 7500 | 86.5 | 0.72 | 2.96 |
| 8 | 1.50 | 0.03 | 0.30 | 2.6 | 90.0 | 3000 | 85.3 | 0.82 | 1.84 |

EXAMPLES 9-16

These examples illustrate the preparation of low crystallinity polypropylene using as catalyst a premix of magnesium neodecanoate and titanium tetrachloride prepared as in Examples 1-3 and activators containing various alkylaluminum halides.

In each example 400 ml of hexane is placed in a 28 oz. pop bottle containing a magnetic stirring bar. The hexane is sparged at 60° C. with an inert gas. Next, the activator is added to the pop bottle. The composition and amount of activator are shown in Table 3. A sufficient amount of activator is added so that the total concentration of aluminum in the hexane is 1 mmolar. Next is added 1 ml of a premix solution which is 20 mmolar with respect to TiCl$_4$ and 100 mmolar with respect to magnesium neodecanoate. The inert gas is removed from the vessel by sparging with propylene and the pressure of the propylene is brought to 40 psig. The polymerization is continued for the time shown in Table 3, until stirring is not possible. The resulting low crystallinity propylene polymers (less than 20% crystallinity) are recovered as in Examples 1–3. Polymerization data for these examples are reported in Table 3.

For the sake of comparison, the above procedure is repeated except that the activator is ethylaluminum dichloride, diethylaluminum hydride, a 50/50 weight mixture of diethylaluminum chloride and diethylaluminum hydride or diethylaluminum ethoxide. Little, if any, polymerization occurs in each case and recoverable amounts of polymer are not obtained.

TABLE 3

| Example No. | Activator | Time (hour) | Yield, g | Mileage | Soluble % | Soluble IV | Insoluble IV |
|---|---|---|---|---|---|---|---|
| 9 | Et$_2$AlCl | 3.9 | 86.0 | 4300 | 85.2 | 0.88 | 2.85 |
| 10 | 90% Et$_2$AlCl 10% EtAlCl$_2$ | 3.3 | 77.6 | 3880 | 85.6 | 0.86 | 2.60 |
| 11 | 70% Et$_2$AlCl 30% EtAlCl$_2$ | 3.3 | 56.2 | 2810 | 86.3 | 0.99 | 2.85 |
| 12 | 90% Et$_2$AlCl 10% Et$_3$Al | 5.8 | 86.3 | 4315 | 86.0 | 0.66 | 1.94 |
| 13 | 80% Et$_2$AlCl 20% Et$_3$Al | 5.8 | 35.4 | 1770 | 85.7 | 0.59 | 2.27 |
| 14 | Me$_2$AlCl[1] | 5.1 | 5.1 | 255 | 86.8 | — | — |
| 15 | iBu$_2$AlCl[1] | 3.8 | 47.4 | 2370 | 87.3 | — | — |
| 16 | Et$_2$AlBr[1] | 3.2 | 48.6 | 2430 | 83.3 | — | — |

[1]Me$_2$AlCl = dimethylaluminum chloride.
iBu$_2$AlCl = diisobutylaluminum chloride.
Et$_2$AlBr = diethylaluminum bromide.

EXAMPLES 17–20

These examples illustrate preferred embodiments of the synthesis of low crystallinity copolymers from various combinations of ethylene, propylene and 1-butene using the catalyst system of Examples 1–3.

In each example a dry 1-gallon stirred autoclave is purged with argon and sealed. Then, 1635 ml dry oxygen-free isobutane is charged to the autoclave and the contents are heated to 60° C. Next, 8 ml of a 25 weight percent solution of diethylaluminum chloride (equivalent to 12.2 millimoles) in hexane is added, followed by the addition of sufficient premix to provide 0.4 mmole titanium tetrachloride and 2 mmoles of magnesium neodecanoate. After 20 minutes, the amount of monomers shown in Table 4 is added to the reactor and the pressure noted. Additional monomers in the weight ratios shown in Table 4, are added as necessary to maintain constant pressure. Each polymerization is continued for the time shown in Table 4 and then terminated by venting to atmosphere pressure. The resulting low crystallinity copolymers are recovered from the isobutane by evaporation.

TABLE 4

| Example | Initial Monomer Charge (g) Propylene (P) | Initial Monomer Charge (g) Ethylene (E) | Initial Monomer Charge (g) Butene (B) | Steady State Monomer Feed wt. Ratio (P/E/B) | Reaction Time (min.) | Polymerization Data Yield, g | Mole % Butene[1] | I.V. | Tg, °C.[2] | Tm, °C.[2] | Cryst % |
|---|---|---|---|---|---|---|---|---|---|---|---|
| 17 | 0 | 4.0 | 595 | 0/1/2 | 122 | 620 | 69 | 1.5 | −51 | 20–120 | 13.1 |
| 18 | 0 | 5.0 | 595 | 0/1/2 | 95 | 640 | 72 | 1.3 | −44 | — | 13.7 |
| 19 | 0 | 1.5 | 217 | 0/1/2 | 239 | 393 | 48 | 2.0 | −66 | 20–122 | none |
| 20 | 66 | 0 | 217 | 1.2/0/1 | 240 | 755 | 53 | 1.2 | −28 | 48 | 5.9 |

[1]Determined by nuclear magnetic resonance spectroscopy (NMR)
[2]Glass transition temperature, (Tg) and melting point (Tm) are determined by differential thermal analysis (DTA)

EXAMPLE 21

This example illustrates a large scale preparation of a low crystallinity copolymer of ethylene and butene-1.

The general procedure of Examples 17 to 20 is repeated on a large scale using a 10 gallon autoclave charged with 5350 grams of isobutane. The charge is heated to 60° C. and 19.8 millimoles of diethylaluminum chloride are added as a 25% solution in hexane. Next 1.0 millimole of titanium tetrachloride and 5.92 millimoles of magnesium neodecanoate are added as separate solutions in hexane and the charge is agitated for 20 minutes, after which time 5150 grams of liquid 1-butene and 206 grams of ethylene are added and the pressure noted. Additional monomer at a butene:ethylene weight ratio of 2:1 is added as necessary to maintain a constant pressure. The polymerization is continued for 55 minutes and then terminated by venting to atmospheric pressure. The yield is 1700 grams of copolymer containing 32 mole % of 1-butene by NMR and having a crystalline content of 2.2%, as ethylene. The copolymer has an IV of 3.1, a glass transition temperature of −67° C. and a melting point range of 0° to 120° C., as determined by DTA.

EXAMPLES 22–23

These examples illustrate the preparation of copolymers of propylene and hexene-1 (Example 22) or propylene and octene-1 (Example 23) using the general procedure of Examples 1 to 3 except that the Et$_2$AlCl, TiCl$_4$ and magnesium neodecanoate are added to the hexane in the form of a preactivated premix which provides 0.2 millimole of Et$_2$AlCl, 0.01 millimole of TiCl$_4$, 0.05 millimole of magnesium neodecanoate and 2.0 grams of hexene-1 or octene-1 and the polymerization is continued for 5.3 hours.

The preactivated premixes used in these examples are prepared by placing in 8 oz. pop bottles containing magnetic stirring bars 120 ml of nitrogen sparged hexane and 12.0 grams of hexene-1 or octene-1, and, while stirring under nitrogen, adding first 1.2 millimoles of Et$_2$AlCl as a hexane solution and then sufficient hexane premix to provide 0.06 millimole of TiCl$_4$ and 0.3 millimole of magnesium neodecanoate and continue the stirring over night at room temperature.

The polymerization data for these examples is reported in Table 5.

TABLE 5

| Example No. | Polymerization Data | | | |
|---|---|---|---|---|
| | Yield, g | Cryst % | Mile-Age | Soluble % |
| 22 | 57.7 | 21 | 5770 | 82.8 |
| 23 | 55.4 | 21 | 5540 | 82.9 |

EXAMPLE 24

This example illustrates the preparation of a high molecular weight, essentially non-crystalline homopolymer of octene-1.

An 8 oz. pop bottle containing a magnetic stirrer bar and sparged with nitrogen is charged with 50 ml of octene-1 and 0.2 millimole of diethylaluminum chloride and placed in a 60° C. bath. Next is added sufficient of the premix of Examples 9–16 to provide 0.01 millimole of titanium tetrachloride and 0.05 millimole of magnesium neodecanoate and the polymerization is carried out for 1.7 hours, at which time stirring is discontinued and the product is diluted with hexane. The product does not contain any insoluble polymer. The hexane soluble polymer (recovered by evaporation) is 20.41 grams of poly(octene-1) having a weight average molecular weight of 262,000, a number average molecular weight of 4900, a molecular weight distribution, Mw/Mn, of 53.38, and a glass transition temperature of $-69°$ C.

EXAMPLE 25

This example illustrates the preparation of a low crystallinity copolymer of propylene and ethylene using the general procedure of Examples 17–20.

In this example the autoclave is charged with 2000 ml dry, oxygen-free isobutane and the charge is heated to 60° C. Next, the diethylaluminum chloride solution (12.2 millimoles) and then the premix (equivalent to 0.4 millimole of titanium tetrachloride and 2 millimoles of magnesium neodecanoate) are added. After 20 minutes 92 grams of propylene and 0.45 gram of ethylene are added and the pressure noted. Additional monomers in the weight ratio of propylene:ethylene of about 20:1 are added as necessary to maintain constant pressure. The polymerization is continued for 7.5 hours and terminated by venting. The resulting copolymer (1175 grams) contains 4.3% ethylene, is 10.3% crystalline, has an I.V. of 2.26, a glass transition temperature of $-23°$ C., a melting point of 144° C. and a heat of fusion of 0.8.

What I claim and desire to protect by Letters Patent is:

1. A process for the production of high molecular weight polyolefins having a degree of crystallinity less than about 25%, which process comprises polymerizing at least one 1-olefin containing at least 3 carbon atoms or a mixture of at least one of said olefins with up to about 67 weight % of ethylene in an inert liquid hydrocarbon diluent at a temperature ranging from about 25° C. to about 90° C. in the presence of a catalytic amount of a catalyst system consisting essentially of
   (a) a hydrocarbon soluble transition metal component derived by contacting in an inert liquid hydrocarbon
      (1) a soluble, halide free magnesium-carboxylate having the general formula $Mg(OOCR')_2$ where each $R'$ is alike or different and is derived from a carboxylic acid containing at least 2 carbon atoms with
      (2) a soluble salt of a transition metal selected from the group consisting of tetravalent titanium, zirconium and hafnium, and
   (b) an alkylaluminum halide activator having the general formula $R_nAlX_{3-n}$ where R is a 1 to 18 carbon alkyl group and n is a number from 1.5 to 2.5, the molar ratio of transition metal salt to magnesium carboxylate being 0.003 to 3, the molar ratio of alkylaluminum halide activator to transition metal salt being at least 1 and the molar ratio of alkylaluminum halide activator to magnesium carboxylate being greater than 2.5.

2. The process of claim 1 wherein at least one 1-olefin is propylene.
3. The process of claim 2 wherein the transition metal salt is titanium tetrachloride.
4. The process of claim 3 wherein the alkylaluminum halide activator is diethylaluminum chloride.
5. The process of claim 4 wherein each $R'$ of the formula $Mg(OOCR')_2$ independently is an alkyl group containing from 5 to 17 carbon atoms.
6. The process of claim 5 wherein the magnesium carboxylate is magnesium neodecanoate.
7. The process of claim 5 wherein the polyolefin is polypropylene.
8. The process of claim 5 wherein the polyolefin is a copolymer of propylene and 1-butene.
9. The process of claim 5 wherein the polyolefin is a copolymer of propylene and ethylene.
10. The process of claim 1 wherein at least one 1-olefin is 1-butene.
11. The process of claim 10 wherein the transition metal salt is titanium tetrachloride.
12. The process of claim 11 wherein the alkylaluminum halide is diethylaluminum chloride.
13. The process of claim 12 wherein each $R'$ of the formula $Mg(OOCR')_2$ independently is an alkyl group containing from 5 to 17 carbon atoms.
14. The process of claim 13 wherein the magnesium carboxylate is magnesium neodecanoate.
15. The process of claim 14 wherein the polyolefin is a copolymer of 1-butene and ethylene.
16. The process of claim 5 wherein the amount of catalyst system provides a titanium concentration between about 0.02 and about 0.4 millimole per liter of hydrocarbon diluent.
17. The process of claim 13 wherein the amount of catalyst system provides a titanium concentration between about 0.02 and about 0.4 millimole per liter of hydrocarbon diluent.

* * * * *